United States Patent
Skaaksrud et al.

(10) Patent No.: US 10,993,167 B2
(45) Date of Patent: *Apr. 27, 2021

(54) SYSTEMS AND METHODS FOR GEO-STAGING OF SENSOR DATA THROUGH DISTRIBUTED GLOBAL (CLOUD) ARCHITECTURE

(71) Applicant: FedEx Corporate Services, Inc., Collierville, TN (US)

(72) Inventors: Ole-Petter Skaaksrud, Lakeland, TN (US); Miley Ainsworth, Hernando, MS (US)

(73) Assignee: FedEx Corporate Services, Inc., Collierville, TN (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/410,702

(22) Filed: May 13, 2019

(65) Prior Publication Data

US 2019/0281528 A1    Sep. 12, 2019

Related U.S. Application Data

(63) Continuation of application No. 15/860,854, filed on Jan. 3, 2018, now Pat. No. 10,334,502, which is a
(Continued)

(51) Int. Cl.
*H04L 29/08*    (2006.01)
*H04W 40/18*    (2009.01)
(Continued)

(52) U.S. Cl.
CPC ......... *H04W 40/18* (2013.01); *H04L 45/3065* (2013.01); *H04L 67/101* (2013.01);
(Continued)

(58) Field of Classification Search
CPC ....... H04W 40/18; H04W 4/02; H04W 4/023; H04W 40/12; H04W 40/20; H04W 4/38;
(Continued)

(56) References Cited

U.S. PATENT DOCUMENTS 9,432,450 B2    8/2016  Skaaksrud et al.
2003/0084076 A1    5/2003  Sekiguchi et al.
(Continued)

FOREIGN PATENT DOCUMENTS

EP    2 678 996    1/2014
JP    2003-131972    5/2003
(Continued)

OTHER PUBLICATIONS

Examination report for Indian Appln. No. 6672/CHENP/2013 dated Oct. 9, 2019 (6 pp).
(Continued)

*Primary Examiner* — Christopher M Brandt
(74) *Attorney, Agent, or Firm* — Finnegan, Henderson, Farabow, Garrett & Dunner LLP (57) ABSTRACT

There is disclosed a method of staging real-time data in proximity to a mobile device. The method includes determining a geographic location associated with the mobile device and identifying a storage device located in proximity to the determined geographic location. The method also includes enabling real-time data published by the mobile device or provided to the mobile device to be stored on the identified storage device.

23 Claims, 6 Drawing Sheets

Related U.S. Application Data continuation of application No. 15/243,119, filed on Aug. 22, 2016, now Pat. No. 9,894,590, which is a continuation of application No. 13/401,648, filed on Feb. 21, 2012, now Pat. No. 9,432,450.

(60) Provisional application No. 61/445,274, filed on Feb. 22, 2011.

(51) Int. Cl.

| | |
|---|---|
| *H04W 4/029* | (2018.01) |
| *H04L 12/725* | (2013.01) |
| *H04W 4/02* | (2018.01) |
| *H04W 40/12* | (2009.01) |
| *H04W 40/20* | (2009.01) |
| *H04W 64/00* | (2009.01) |
| *H04W 4/38* | (2018.01) |
| *H04W 4/70* | (2018.01) |

(52) U.S. Cl.
CPC ...... *H04L 67/1021* (2013.01); *H04L 67/1023* (2013.01); *H04L 67/12* (2013.01); *H04L 67/18* (2013.01); *H04L 67/2842* (2013.01); *H04W 4/02* (2013.01); *H04W 4/023* (2013.01); *H04W 4/029* (2018.02); *H04W 40/12* (2013.01); *H04W 40/20* (2013.01); *H04W 4/38* (2018.02); *H04W 4/70* (2018.02); *H04W 64/006* (2013.01)

(58) Field of Classification Search
CPC ..... H04W 4/70; H04W 4/029; H04W 64/006; H04L 67/2842; H04L 67/1023; H04L 67/1021; H04L 67/12; H04L 67/18; H04L 45/3065; H04L 67/101

See application file for complete search history.

(56) References Cited

U.S. PATENT DOCUMENTS

| | | |
|---|---|---|
| 2004/0044649 A1 | 3/2004 | Yamato et al. |
| 2005/0137933 A1 | 6/2005 | Holsen et al. |
| 2006/0156209 A1 | 7/2006 | Matsuura et al. |
| 2007/0050340 A1 | 3/2007 | von Kaenel et al. |
| 2009/0029692 A1 | 1/2009 | Radermacher et al. |
| 2009/0124263 A1 | 5/2009 | Wirtl |
| 2009/0147725 A1 | 6/2009 | Shin et al. |
| 2010/0070334 A1 | 3/2010 | Monteverde |
| 2010/0176992 A1 | 7/2010 | T'siobbel |
| 2010/0332831 A1 | 12/2010 | Shon et al. |
| 2011/0029952 A1 | 2/2011 | Harrington |
| 2011/0092237 A1 | 4/2011 | Kato et al. |
| 2011/0153525 A1 | 6/2011 | Benco et al. |
| 2011/0238289 A1 | 9/2011 | Lehmann et al. |
| 2012/0290643 A1 | 11/2012 | Fok Ah Chuen et al. |

FOREIGN PATENT DOCUMENTS

| | | |
|---|---|---|
| JP | 2003-140930 | 5/2003 |
| JP | 2005-352844 | 12/2005 |
| JP | 2007-025897 | 2/2007 |
| JP | 2007-133503 | 5/2007 |
| JP | 5316966 | 7/2013 |
| WO | WO 2010/026799 | 3/2010 |
| WO | WO 2012/115970 | 8/2012 |

OTHER PUBLICATIONS

"*Enterprise Cloud Design and Understanding Latency*" from Cloud Computing Journal dated Mar. 25, 2010, http://cloudcomputing.syscon.com/node/1332826, 2 pages.

"*Cloud Computing and Latency*" published by Agathon Group dated Apr. 29, 2010, http://www.agathongroup.com/blog/2010/04/cloud-computing-and-latency/, 3 pages.

Bo Sheng et al: "An Approximation Algorithm for Data Storage Placement in Sensor Networks", Wireless Algorithms, Systems and Applications, 2007. WASA 2007. International Conference On, IEEE, Piscataway, NJ, USA, Aug. 1, 2007 (Aug. 1, 2007), pp. 71-78, XP031334842, ISBN: 978-0-7695-2981-3.

Hyuntaek Kwon et al: "Low-Latency Routing for Energy-Harvesting Sensor Networks", Jul. 11, 2007 (Jul. 11, 2007), Ubiquitous Intelligence and Computing; [Lecture Notes in Computer Science], Springer Berlin, Heidelberg, pp. 422-433, XP019096663, ISBN: 978-3-540-73548-9.

Mingjian Tang et al: "Efficient power management for Wireless Sensor Networks: A data-driven approach", 33rd IEEE Conference on Local Computer Networks (LCN 2008)—Oct. 14-17, 2008—Montreal, Que, Canada, IEEE, Piscataway, NJ, USA, Oct. 14, 2008 (Oct. 14, 2008), pp. 106-113, XP031355834, ISBN: 978-1-4244-2412-2.

Arijit Ganguly et al: "Techniques for low-latency proxy selection in wide-area P2P networks", Parallel & Distributed Processing, Workshops and PHD Forum (IPDPSW), 2010 IEEE International Symposium On, IEEE, Piscataway, NJ, USA, Apr. 19, 2010 (Apr. 19, 2010), pp. 1-8, XP031680307, ISBN: 978-1-4244-6533-0.

International Search Report and Written Opinion, for International Application No. PCT/US2012/025947, dated Mar. 25, 2013 (Mar. 25, 2013), 21 pages.

Japanese Patent Office, Notice of Reasons for Rejection in corresponding Japanese Application No. JP2013-5546787 and English translation thereof, dated Nov. 10, 2016.

Examiner's report for Canadian Appln. No. 2,827,358 dated Sep. 22, 2020 (3 pp).

| Device | Location |
|---|---|
| Storage Device 102 | Location A |
| Storage Device 104 | Location B |
| Storage Device 106 | Location C |
| Storage Device 108 | Location D |
| ⋮ | ⋮ |

502 – Device column
504 – Location column
506 – Storage Device 102 / Location A
508 – Storage Device 104 / Location B
510 – Storage Device 106 / Location C
512 – Storage Device 108 / Location D

SYSTEMS AND METHODS FOR GEO-STAGING OF SENSOR DATA THROUGH DISTRIBUTED GLOBAL (CLOUD) ARCHITECTURE

RELATED APPLICATION

This application is a continuation of U.S. patent application Ser. No. 15/860,854, filed Jan. 3, 2018, now allowed, which is a continuation of U.S. patent application Ser. No. 15/243,119, filed Aug. 22, 2016, now U.S. Pat. No. 9,894,590, issued Feb. 13, 2018, which is a continuation of U.S. patent application Ser. No. 13/401,648, filed Feb. 21, 2012, now U.S. Pat. No. 9,432,450, issued Aug. 30, 2016, which claims the benefit of priority from U.S. Provisional Application No. 61/445,274, filed Feb. 22, 2011. The disclosures of the above-referenced applications which are hereby incorporated herein by reference in their entireties.

TECHNICAL FIELD

The present disclosure generally relates to the field of computerized systems. More particularly, the disclosure relates to computerized systems and methods for geo-staging and/or location-based staging of sensor data through distributed global or cloud architectures.

BACKGROUND INFORMATION

Latency, in a general sense, is a measure of time delay experienced in a system. In a non-trivial computer network, for example, a typical packet of data will be forwarded from a source to a destination over many links and via numerous intermediate gateway devices. Each link introduces a delay into the path of the data packet, and each gateway device generally does not start forwarding the received packet until it has been completely received.

In such a network, the minimal latency is the sum of the latency of each link (except the final one), plus the forwarding latency of each gateway. In practice, this minimal latency is further augmented by queuing and processing delays at the gateways. Queuing delays occur, for example, when a gateway receives multiple packets from different sources heading towards the same destination. Since often only one packet can be transmitted at a time by the gateway, some of the received packets must queue for transmission, thereby incurring additional delay. Processing delays, on the other hand, are incurred while a gateway determines what to do with a newly received packet. The combination of link, gateway, queuing, and processing delays, among others, may produce a complex and variable network latency profile.

There are some known ways of reducing and simplifying network latency, such as caching and aging of data based on geographical location. For example, caching may involve storing commonly-accessed data in geographically-nearby storage to avoid undue latency, while aging of data may involve deleting data from the cache that is older than a certain age. These techniques may not only reduce latency on the delivery of data but also may ensure the latest available data.

In a cloud computing or other distributed architecture, for example, location independence of terminals, such as mobile devices, may enable the terminals to access data on the cloud regardless of the location of the terminals or the stored data. Thus, the mobile devices may be frequently moving while maintaining access to data on the cloud.

SUMMARY

In accordance with disclosed embodiments, there is provided a method of staging real-time data in proximity to a mobile device, the method comprising: determining a geographic location associated with the mobile device; identifying a storage device located in proximity to the determined geographic location; and enabling real-time data published by the mobile device or provided to the mobile device to be stored on the identified storage device.

In accordance with disclosed embodiments, there is further provided a computer-readable medium storing instructions, which, when executed by a processor, cause the processor to perform a method of staging real-time data in proximity to a mobile device, the method comprising: determining a geographic location associated with the mobile device; identifying a storage device located in proximity to the determined geographic location; and enabling real-time data published by the mobile device or provided to the mobile device to be stored on the identified storage device.

In accordance with disclosed embodiments, there is further provided a system for staging real-time data in proximity to a mobile device, the system comprising a host device configured to: determine a geographic location associated with the mobile device; identify a storage device located in proximity to the determined geographic location; and enable real-time data published by the mobile device or provided to the mobile device to be stored on the identified storage device.

In accordance with disclosed embodiments, there is further provided a method of staging real-time data to reduce communication latency, the method comprising: identifying a storage device from a plurality of possible storage devices, the identified storage device having a lower connection latency to the mobile device than others from the possible storage devices; and enabling real-time data published by the mobile device or provided to the mobile device to be stored on the identified storage device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate disclosed embodiments and together with the description, serve to explain the principles of the disclosed embodiments.

DETAILED DESCRIPTION

This disclosure generally relates to staging real-time data in proximity to a mobile device in order to reduce access latency. Real-time in many practical implementations would be "near real-time", describing the intent to deliver, consume, and/or produce data in real-time. In one example, the mobile device may be publishing real-time data, such as sensor-collectable data, for analysis elsewhere. It may be possible to reduce network latency by having the mobile device stage the real-time data on a storage device that is proximate to the mobile device. In another example, the mobile device may be analyzing real-time data collected elsewhere. In such an example, it may be possible to reduce networking latency by staging the data proximate to the mobile device for the mobile device to access.

As discussed herein, the term "staging" may refer to temporarily storing data at a particular storage location, for example at a gateway or a router, that is in proximity to a mobile device. In some embodiments, data may be staged at a storage device, so that a proximate mobile device may access the data for analysis. In other embodiments, the mobile device may stage data it collects by storing it at a proximate storage device for analysis elsewhere.

The terms "proximity" or "proximate" may refer to a storage device that is physically near to a mobile device. Such a storage device may be the closest available storage device to the mobile device. Alternatively, such a storage device may not be the closest available storage device, but may be one of a predetermined number of nearby storage devices. For example, the storage device may be one of the 5, 10, or 15 closest storage devices to the mobile device.

In some embodiments, given a choice between two storage devices, a storage device located geographically closer to a mobile device would have an reduced latency in delivering real-time data than the farther storage device.

Alternatively or additionally, the terms "proximity" or "proximate" may refer to a storage device that is logically near to a mobile device. Such a storage device may have the fewest number of links connecting it to the mobile device. Alternatively, such a storage device may not have the fewest number of links connecting it to the mobile device, but may be one of a predetermined number of storage devices with the fewest links. For example, the storage device may be one of the 5, 10, or 15 storage devices with the least number of links to the mobile device.

In some embodiments, the terms "proximity" or "proximate" may refer to a storage device identified by balancing multiple factors, such as the processing speed of the storage device, the number of links between the storage device and the mobile device, the speed of those links, and/or the length of the links. Based on a combination of those factors, the storage device with the least expected latency may be used for staging data.

Thus, generally speaking, in some embodiments, data may be stored at a storage device with a relatively low latency between it and a mobile device. For example, the storage device may have the lowest communication latency between itself and the mobile device. Alternatively, the storage device may be one of 5, 10, or 15, for example, storage devices with the lowest communication latency to the mobile device.

Staging real-time data proximate to a mobile device may also reduce a financial cost of delivering the real-time data. For example, a storage device proximate to a mobile device may have fewer carrier or network charges associated with communications between the storage device and the mobile devices. Thus, from a financial point of view, it may be advantageous to stage real-time data near a mobile device.

In disclosed embodiments, the mobile devices may be moving regularly. Thus, disclosed embodiments may enable real-time data to be stored in proximity to a mobile device depending on an updated or predicted location of the mobile device.

In some embodiments, the real-time information is collected from one or more mobile devices associated with a package in a delivery network. The mobile devices, such as sensors, may be used to collect information associated with packages in transit. The delivery network in one example comprises a network of transportation vehicles such as airplanes, trains, trucks and other means for transporting goods of any type. The delivery network may be used to collect packages from sources (for example, senders) and to deliver the packages to destinations (for example, recipients).

In one example embodiment, one or more mobile devices may be associated with a package; in other words, the one or more mobile devices may be placed within a package, attached to a package, or otherwise placed within a vicinity of the package. The precise location of a mobile devices in relation to the package (within, attached, within the vicinity, or in close proximity, for example) may not matter; what matters is that in some embodiments, the one or more mobile devices can effectively collect the particular type of information associated with the package and/or its contents. For example, this sensor-collectable information may include geographic location information and/or other conditions associated with the package or its contents at any given time, including exterior and/or interior temperature of the package, humidity within or about the package, moisture levels within or about the package, altitude of the package, and any other conditions that sensors can collect. For purposes of this disclosure, a container or package may be a box, envelope or any other media used to ship documentation or products from one point to another. And an "article" may be used to refer to the container etc. and its contents.

In some embodiments, the real-time information may be collected from one or more mobile devices associated with a package in a delivery network, as discussed above. Real-time information, however, is not limited to sensor-collectable information about an environment of a package, and may include other information such as: stock prices, news headlines, interest rates, Twitter feeds, and/or sports scores. In general, real-time data may be information that may frequently change or update, and that may be time-dependent.

The shared information may also drive logic residing on a mobile device, such as a sensor, where real-time availability of the shared information is needed to eliminate the need of the sensor to duplicate information capture. For example, a first sensor may read temperature data collected by a second sensor nearby, instead of collecting the temperature data itself. This may lower the cost of the first sensor, since it would not need components for collecting the temperature data. For these reasons, it may be important to reduce the delivery latency of real-time data.

Reference will now be made in detail to exemplary embodiments, examples of which are illustrated in the accompanying drawings. Wherever possible, the same reference numbers will be used throughout the drawings to refer to the same or like parts.

Figure 1:
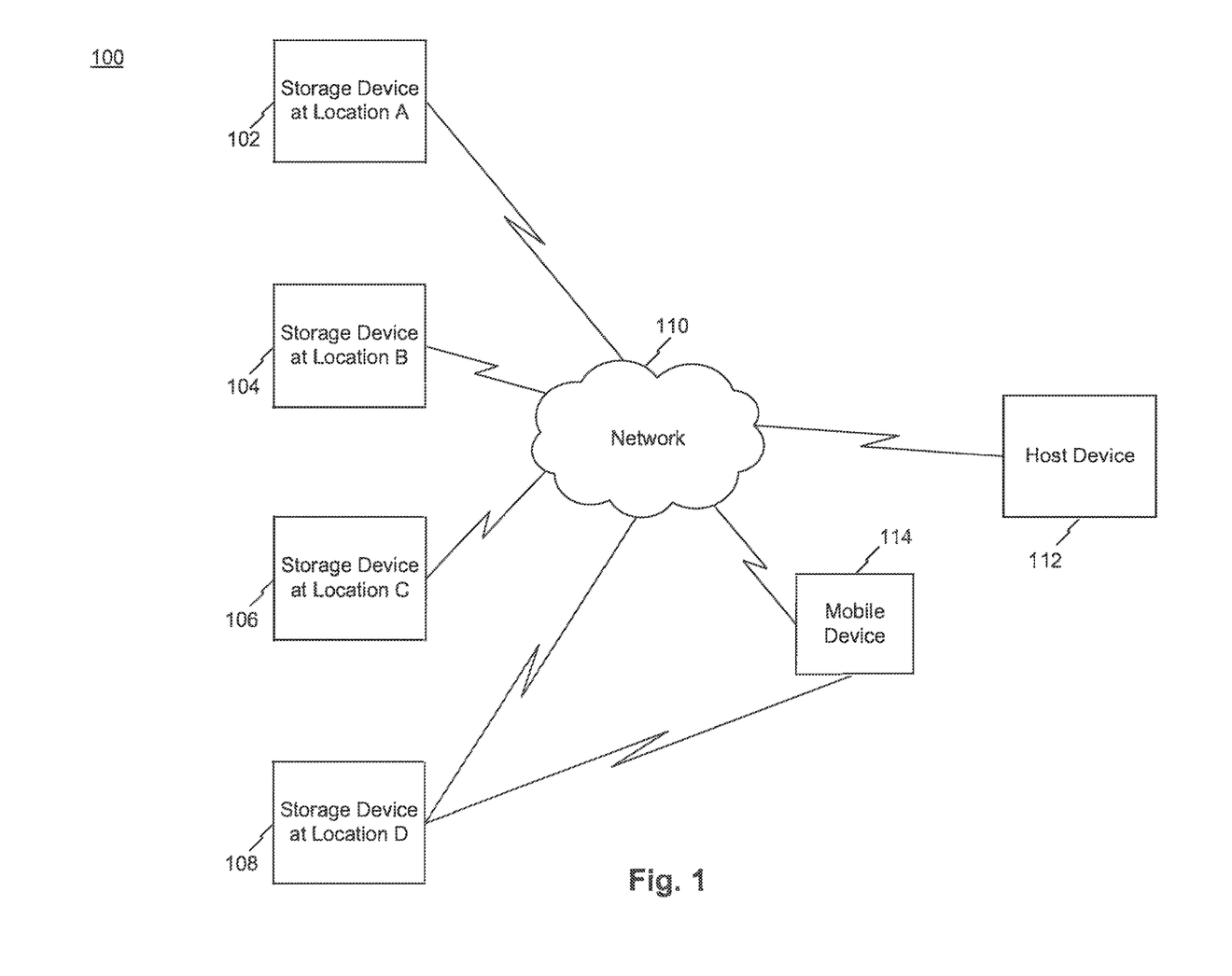
FIG. 1 illustrates a system for distributing real-time data.

FIG. 1 illustrates a system 100 for distributing real-time data. System 100 may include storage devices at different locations. For example, system 100 may include a storage device 102 at location A, a storage device 104 at location B, a storage device 106 at location C, and a storage device 108 at location D.

Storage devices 102-108 may interface with network 110 to connect with each other, at least one host device 112, and/or at least one mobile device 114. Network 110 may be a shared, public, or private network, may encompass a wide area or local area, and may be implemented through any suitable combination of wired and/or wireless communication networks. Furthermore, network 110 may comprise a local area network (LAN), a wide area network (WAN), an intranet, or the Internet. Network 114 may be a cloud network, a mesh network, or some other kind of distributed network. In some embodiments, some combination of storage devices 102-108, host device 112, and/or mobile device 114 may be directly connected, via a wired or wireless connection, instead of connecting through network 110.

Mobile device 114 may be moving geographically among many locations, such as locations A, B, C, and D, proximate to storage devices 102-108. Mobile device 114 may publish and/or analyze real-time data from/to host device 112, for example.

Host device 112 may identify a current or predicted location of mobile device 114. For example, host device 112 may poll mobile device 114 and request its GPS coordinates. Upon receipt of the GPS coordinates, host device 112 may identify the closest storage device that mobile device 114 may be able to interact with. For example, host device 112 may determine that mobile device 114 is proximate to storage device 108, located at location D. Thus, host device 112 may inform mobile device 114 that storage device 108 at location D is the closest storage device. Mobile device 114 may establish a connection with storage device 108 at location D, either via network 110, a direct connection, or some other connection. Mobile device 114 may also publish real-time data that is has collected to storage device 108 at location D via the established connection. For example, mobile device 114 may collect environmental data about a package in transit, that may need to be analyzed elsewhere, such as by host device 112. The environmental data may be time-sensitive and may need to be analyzed in real-time or near real-time. By sending the real-time data to the closest storage device (e.g., storage device 108 at location D), mobile device 114 may reduce the latency or financial cost associated with the environmental data when it travels to host device 112 for analysis, for example.

Alternatively, instead of publishing data, mobile device 114 may download, read, or be provided data for processing. For example, if mobile device 114 is associated with a package in transit, mobile device 114 may need to download other real-time information to make a determination relating to the package. For example, mobile device 114 may accompany a package in transit that cannot be in an environment that exceeds a certain temperature. If the package is scheduled to be transported from a truck to a warehouse, mobile device 114 may need to determine whether the temperature in the warehouse is within the threshold for the package. Thus, mobile device 114 may need to retrieve real-time temperature information from inside the warehouse. If the temperature inside the warehouse exceeds the temperature threshold for the package, then mobile device 114 may trigger an alarm or take other action. In some embodiments, the package may have the capability of passively or actively controlling its internal temperature, and may do so according to the warehouse temperature, either before or after being transported to the warehouse.

In some embodiments, host device 112 may store or have access to the temperature information collected by sensors inside the warehouse, and may publish this information to a storage device proximate to mobile device 114 (e.g., storage device 108 at location D). By staging this data close to mobile device 114, host device 112 may reduce the amount of time it takes for mobile device 114 to retrieve the temperature data for the warehouse. With faster access to real-time data, the temperature analysis of mobile device 114 is more likely to be accurate.

System 100 is exemplary, and the number and distribution of the various entities shown may be different depending on specific embodiments. For example, the components in system 100 may be combined and/or distributed over multiple entities, including other computers, handheld computers, mobile phones, tablet computers, or other computing platform. Thus, the configuration described in system 100 is an example only and is not intended to be limiting.

Figure 2:
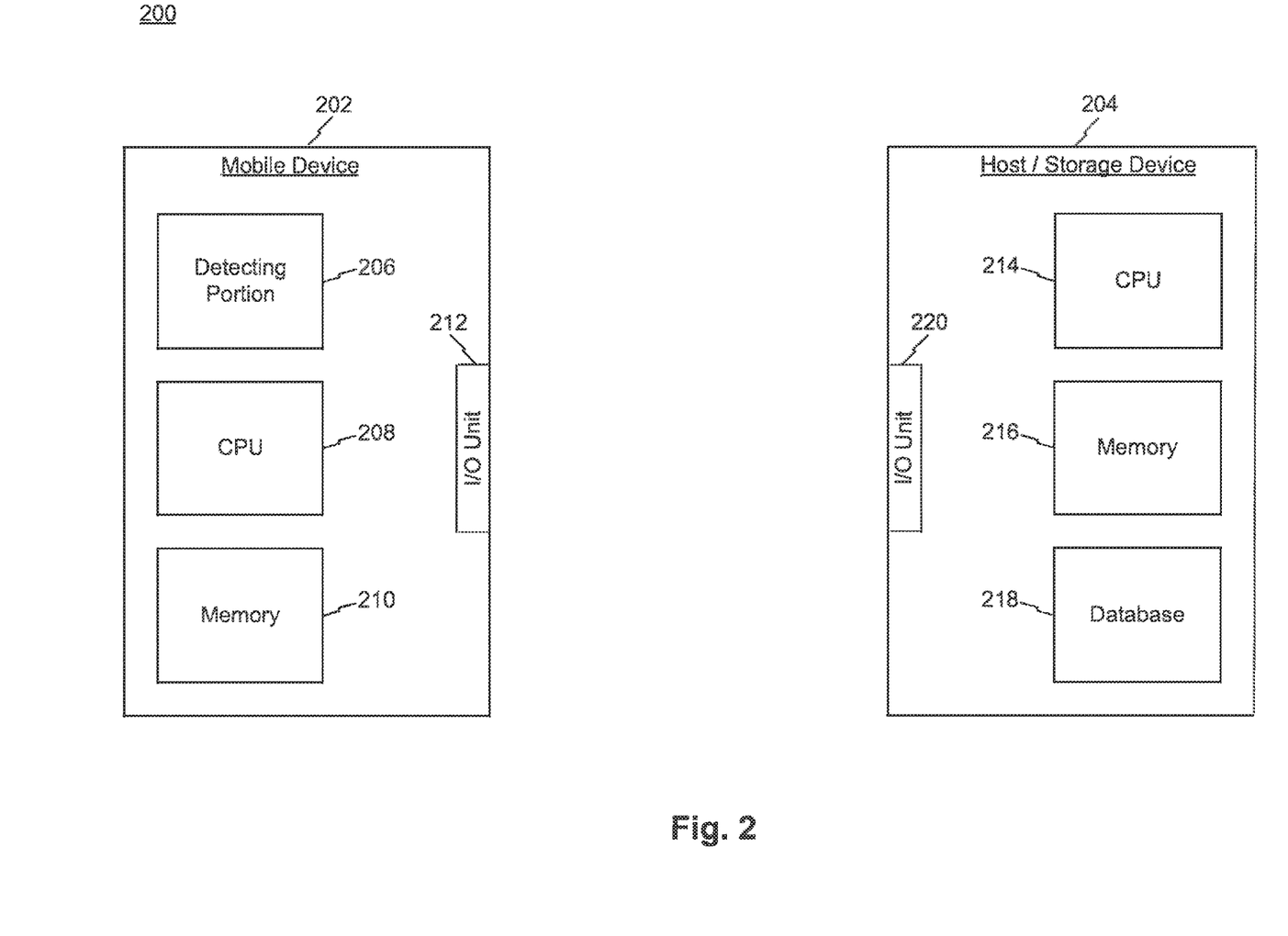
FIG. 2 illustrates devices of an exemplary system for staging real-time data.

FIG. 2 illustrates devices of an exemplary system 200 for staging real-time data. System 200 may include mobile device 202 and host/storage device 204. Mobile device 202 may be similar to mobile device 114 from FIG. 1, and host/storage device 204 may be similar to one of storage devices 102-108 or host device 112. Both mobile device 202 and host/storage device 204 may include general-purpose computing components configured to execute special-purpose instructions or code to perform certain actions.

Mobile device 202 may include detecting portion 206, which may include one or more software and/or hardware components for collecting data, such as environmental data. For example, detecting portion 206 may collect location information about itself. In some embodiments, location information may include the use of a Global Positioning System (GPS). Alternately, location information may be determined through cellular triangulation, wireless network association, the capture of fixed location scan, or the capture of mobile location scan. Some exemplary aspects of mobile device 202 are described in U.S. application Ser. Nos. 13/351,861 and 13/351,852, the entire contents of which are hereby incorporated by reference.

In addition to location information, detecting portion 206 may collect other data about the environment surrounding mobile device 202. For example, detecting portion 206 may collect data about temperature, light level, motion, pressure, humidity, gas level, airflow, vibrations, radiation, time, audio, video, orientation, or other environmental conditions. If mobile device 202 is associated with a package in transit, the environment of the package may need to be within certain parameters, such as within a certain temperature, pressure, or humidity range. Other information like time, audio, or video may be relevant to determine the circumstances of delivery of the package. For example, mobile device 202 may take a photograph or video of the person accepting the package when the package is delivered, or arrives at an intermediate destination, like a processing center. Mobile device 202 may also take audio or determine a time. Mobile device 202 may also collect information input from a user or elsewhere, such a Twitter status updates, photographs, location information, etc. In some embodiments, mobile device 202 may include numerous detecting portions 206, each of which may be configured to collect a different kind of environmental data. In some embodiments, a single detecting portion 206 may be capable of collecting different kinds of environmental data.

Mobile device 202 may also include central processing unit (CPU) 208 and memory 210 to process data, such as the collected environmental data, inputted data, or data retrieved from a storage device. CPU 208 may include one or mare processors configured to execute computer program instructions to perform various processes and methods. CPU 208 may read the computer program instructions from memory 210 or from any computer-readable medium. Memory 210 may include random access memory (RAM) and/or read only memory (ROM) configured to access and store information and computer program instructions. Memory 210 may also include additional memory to store data and information and/or one or more internal databases to store tables, lists, or other data structures.

Mobile device 202 may include I/O Unit 212 for sending data over a network or any other medium. For example, I/O Unit 212 may send data over a network, point-to-point, and/or point-to-multipoint connection either wirelessly or over a cable.

Host/storage device 204 may include a CPU 214 and/or a memory 216, which may be similar to CPU 208 and memory 210 from mobile device 202. Host/Storage Device 204 may also include database 218. Database 218 may store large amounts of data, and may include a magnetic, semiconductor, tape, optical, or other type of storage device. In some embodiments, database 218 may store historical data for auditing purposes. Host/storage device 204 may include an I/O Unit 220 for communicating with mobile device 202. I/O Unit 220 may be similar to I/O Unit 212 on mobile device 202.

System 200 is exemplary only, and the number and distribution of the various entities shown may be different depending on specific embodiments. For example, in some embodiments, mobile device 202 may not include detecting portion 206, CPU 208, and/or memory 210. In some embodiments, host/storage device 204 may be distributed over multiple entities, including other distribution systems, sensors, computers, handheld computers, mobile phones, tablet computers, or other computing platform. Mobile device 202 may similarly be implemented or distributed over any computing platform. Thus, the configuration described in system 200 is an example only and is not intended to be limiting.

Figure 3:
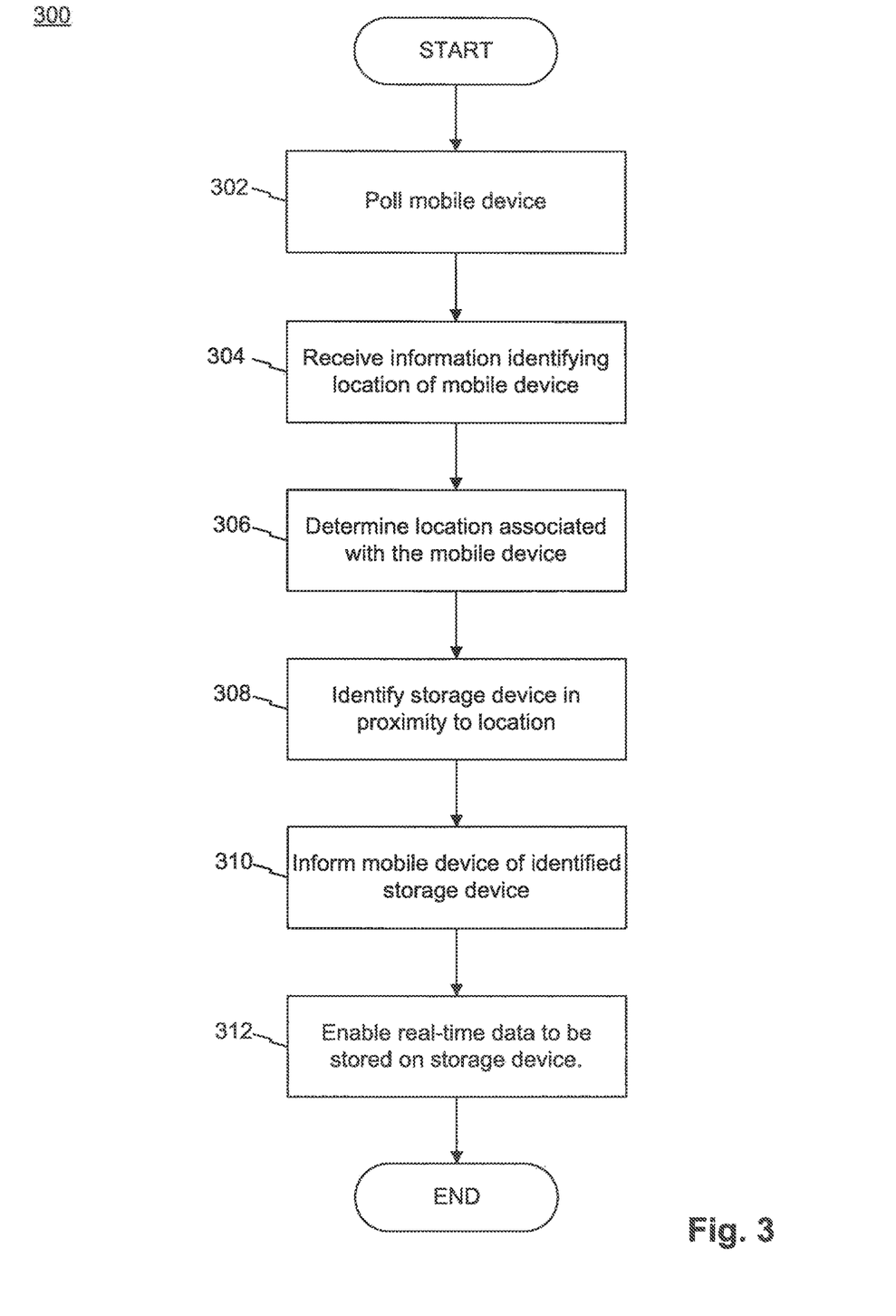
FIG. 3 illustrates the operations of an exemplary method for staging real-time data in proximity to a mobile device.

FIG. 3 illustrates the operations of an exemplary method 300 for staging real-time data in proximity to a mobile device. Method 300 may be executed by CPU 214 on host device 112. Method 300 may also be performed in conjunction with other components shown or not shown in system 100. As explained, in some implementations, some steps in method 300 are optional and can be rearranged. Additional steps can also be added to method 300.

To begin, host device 112 may poll mobile device 114 to obtain location information for mobile device 114 or to determine a location of mobile device 114 (step 302). Alternatively, to determine a location of mobile device 114, host device 112 may have access to a travel plan of mobile device 114, may receive user input indicating a location of mobile device 114, or may interact with another computing device to determine the location of mobile device 114.

Host device 112 may then receive information identifying the location of mobile device 114 (step 304). For example, mobile device 114 may respond to the poll with GPS or other location information. Alternatively or additionally, mobile device 114 may respond to the poll with a network address, such as an IP address. Host device 112 may then determine a location associated with mobile device 114 from the information accompanying the poll response (step 306). This step may be optional if the data provided by mobile device 202 already indicates a location, such as GPS coordinates. But if mobile device 114 provides a network address, for example, host device 112 may need to determine a location associated with the network address at step 306. For example, certain prefixes or combinations of letter and/or numbers in the network address may be associated with a particular geographic or topographical location.

Next, host device 112 may identify a storage device in proximity to the determined location (step 308). Using the example from FIG. 1, host device 112 may determine that storage device 108 at location D is the closest to mobile device 114. Then, host device 112 may inform mobile device 114 that storage device 108 at location D, for example, is the closest storage device that mobile device 114 may use at that moment in time (step 310).

Host device 112 may then enable real-time data to be stored on storage device 108 at location D (step 312). For example, host device 112 may store real-time data on storage device 108 at location D for mobile device 114 to download. Alternatively, host device 112 may read data from storage device 108 at location D that has been published by mobile device 114. Method 300 may then end.

Figure 4:
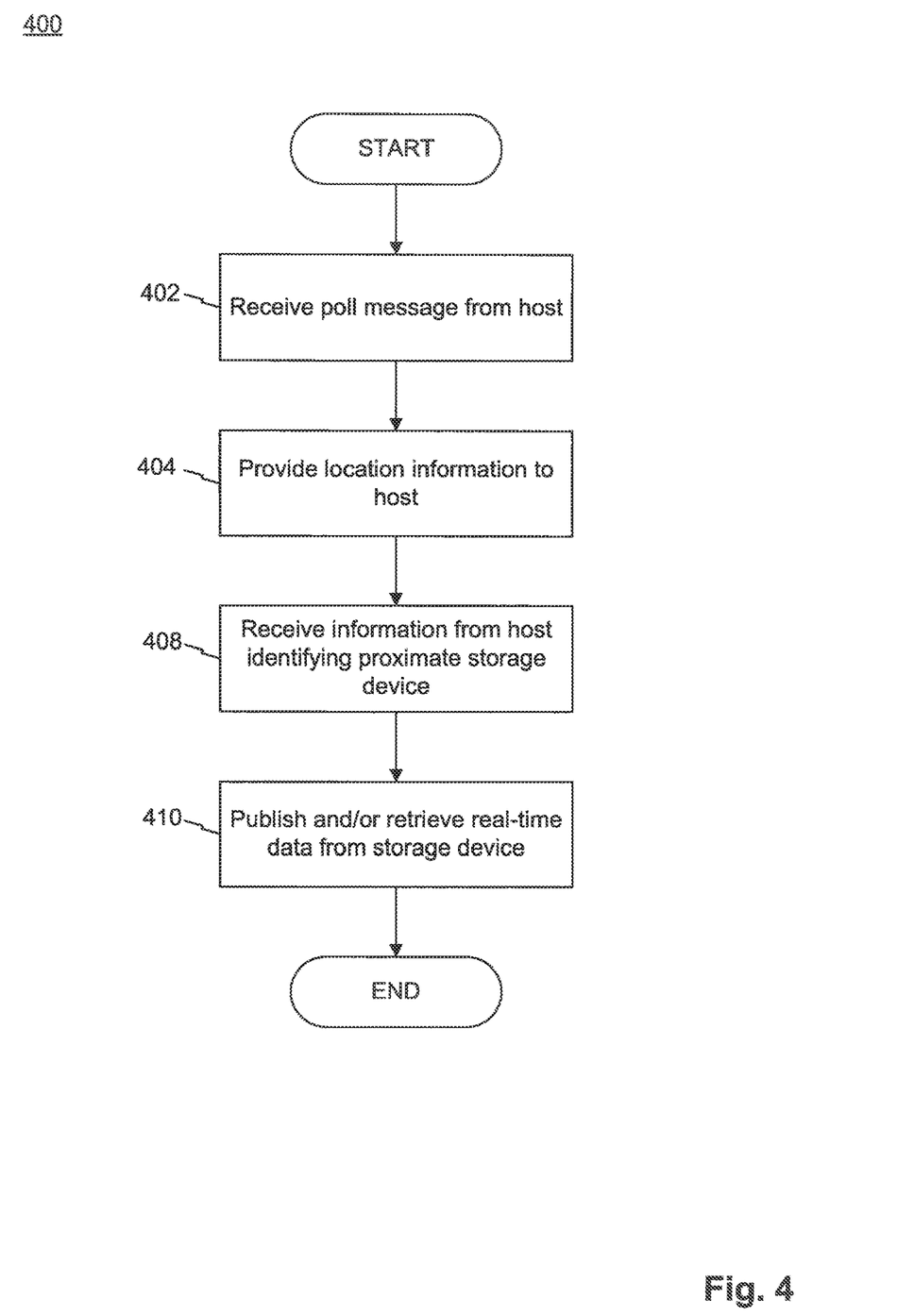
FIG. 4 illustrates the operations of an exemplary method interacting with real-time data staged nearby by a host device.

FIG. 4 illustrates the operations of an exemplary method 400 for interacting with real-time data staged nearby by host device 112. Method 400 may be executed by CPU 208 on mobile device 114. Method 400 may also be performed in conjunction with other components not shown in system 100. As explained, some steps in method 400 are optional and can be rearranged. Additional steps can also be added to method 400.

Method 400 begins by mobile device 114 receiving a poll message from host device 112 (step 402). The poll message may request location information from mobile device 114. Mobile device 114 may respond to the poll by providing location information to host device 112 (step 404). For example, mobile device 114 may provide GPS location or other location information to host device 112. Alternatively or additionally, mobile device 114 may provide its network address to host device 112.

Next, mobile device 114 may receive information from host device 112 identifying a proximate storage device (step 408). For example, mobile device 114 may receive an indication that storage device 108 at location D is the closest storage device with which mobile device 114 may interact. Mobile device 114 may then publish and/or retrieve real-time data from the identified storage device (step 410). For example, mobile device 114 may publish information describing an environment of a package in transit to storage device 108 at location D. As another example, mobile device 114 may retrieve environmental conditions collected by other mobile devices from storage device 108 at location D. Because this real-time information is staged proximate to mobile device 114, the delay and/or cost in providing it for processing may be reduced.

Figure 5:
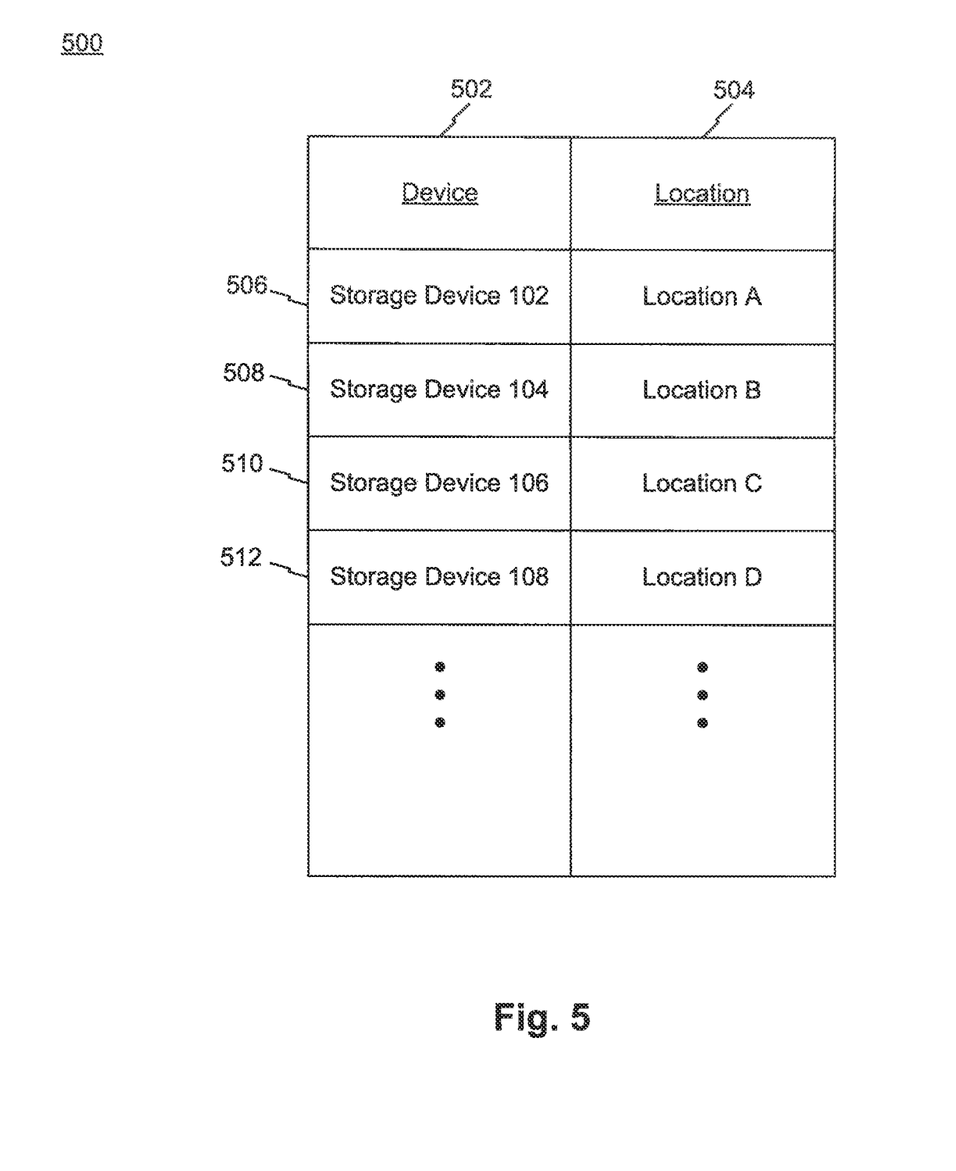
FIG. 5 illustrates an example of a table for identifying a storage device in proximity to a mobile device.

As discussed above, after determining a location of mobile device 114, host 112 may need to identify a proximate storage device. This may be done in different ways. FIG. 5 illustrates an example of a table 500 for identifying a storage device in proximity to mobile device 114. Table 500 may be stored in memory 216 and/or database 218 of host device 112.

Table 500 may include columns 502 and 504. Column 502 may list various storage devices. Various types of identifiers may be used for the storage devices in column 502, such as a network address, name, or any other identifier. Column 504 may list one or more locations associated with the listed storage devices. Various types of identifiers may be used for the location in column 504, such as GPS coordinates, a range of GPS coordinates, other mapping coordinates, a description of a known area like a county or city, a network address, or any other manner by which to identify a geographical location.

By way of example, row 506 of table 500 may identify "Storage Device 102" as a storage device and "Location A" as a location. This means that if mobile device 114 is in "Location A," then "Storage Device 102" is the proximate storage device through which mobile device 114 should interact. Similarly, row 508 of table 500 may identify "Storage Device 104" as a storage device and "Location B" as a location. This means that if mobile device 114 is in "Location B," then "Storage Device 104" is the proximate storage device through which mobile device 114 should interact. In rows 510 and 512, table 500 illustrates similar examples for "Storage Device 106" in "Location C" and "Storage Device 108" in "Location D," respectively.

In disclosed embodiments, mobile device 114 may be moving fairly rapidly from location to location. For example, mobile device 114 may be in a car or truck, or may be transported in some other way. To enable the staging of data proximate to mobile device 114 during movement, host device 112 may need to predict a future location of mobile device 114, and then ensure that the data is staged at a storage device proximate to the predicted location.

Figure 6:
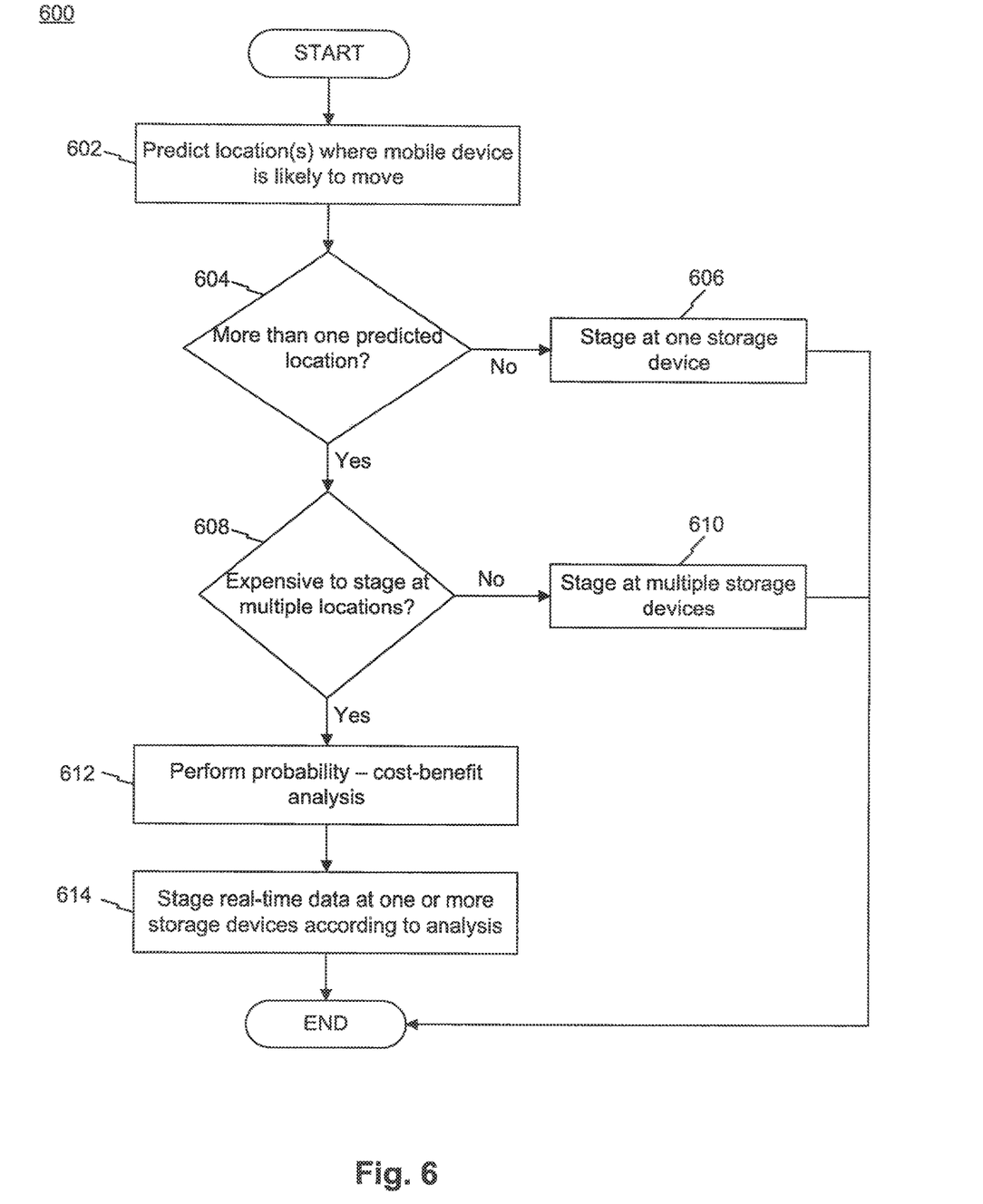
FIG. 6 illustrates operations of an exemplary method for staging data at a predicted location for mobile device.

FIG. 6 illustrates operations of an exemplary method 600 for staging data at a predicted location for mobile device 114. Method 600 may be executed by CPU 214 on host device 112. Method 600 may also be performed in conjunction with other components not shown in system 100. As explained, some steps in method 600 are optional and can be rearranged. Additional steps can also be added to method 600.

To begin, host device 112 may predict one or more locations where mobile device 114 is likely to move (step 602). For example, host device 112 may receive a plurality of GPS coordinates in a short amount of time from mobile device 114. From the multiple coordinates, host device 112 may be able to determine a speed and direction in which mobile device 114 is travelling. From the speed and direction, and in consultation with a map, host device 112 may be able to predict a future location of mobile device 114.

There are other ways host device 112 can predict a future location of mobile device 114. For example, host device 112 may be aware of an expected route or path of mobile device 114. Mobile device 114 may be accompanying a package in transit on an expected route. Host device 112 may know the expected route and may predict a future location of mobile device 114 accordingly. Host device 112 may also use mapping or graphing algorithms to determine an expected route if host device 112 has limited information, such as only a source and destination location.

Host device 112 may determine whether or not it has identified more than one predicted location (step 604). In disclosed embodiments, host device 112 may identify multiple predicted locations where mobile device 114 may travel. Each of the locations may have an associated probability or likelihood that mobile device 114 will travel there. If the probability for a location is above a threshold amount, host device 112 may consider the location to be a predicted location. Accordingly, host 112 may predict more than one possible location.

There are other ways that host device 112 may identify more than one predicted location of mobile device 114. For example, host device may know a source and destination location of mobile device 114, and also know that there are two possible routes for mobile device 114 to follow. Thus, in this example, host device 114 may identify a location on each of the two routes as predicted locations.

Alternatively or additionally, host device 112 may determine more than one predicted location as different points along the same route. For example, host device may take into account a possible travel delay (such as a traffic disruption) in predicting a future location for mobile device 114. Thus, host device 112 may predict a location along a route if there is no delay and also predict another location along the same route if there is a delay.

If host device 112 does not identify more than one predicted location, then host device 112 ensures that the real-time data is staged at a storage device proximate to the one predicted location (step 606). For example, host device 112 may store real-time data at the proximate storage device or indicate to mobile device 114 that it publish real-time data to the proximate storage device.

Alternatively, if host device 112 does identify more than one predicted location, then host device 112 may determine whether or not it is financially expensive to stage real-time data at storage devices in multiple locations (step 608). This may be the case, for example, if there are network or carrier fees associated with staging real-time data. If it is not expensive to stage data at multiple predicted locations, then host device 112 may stage real-time data at multiple storage devices (step 610). For example, host device 112 may store real-time data at multiple storage devices or indicate to mobile device 114 that it publish real-time data to multiple storage devices. In this way, host device 112 may increase the chances of staging the real-time data proximate at a future location of mobile device 114.

If, however, it is expensive to stage the real-time data at multiple locations, then host device 112 may perform a probability-cost-benefit analysis (step 612). For example, host device 112 may associate a probability or likelihood that mobile device 114 will be at each of the multiple predicted locations. Storage devices associated with each of these locations may also have a financial cost associated with them. For a storage device associated with a predicted location, host device 112 may multiply the financial cost of staging real-time data at the storage device with the probability that mobile device 114 will be geographically proximate to the storage device to determine a weight. After performing this probability-cost-benefit analysis on each of the storage devices associated with the predicted locations, host device 112 may have a list of the storage devices, each storage device being associated with a weight (probability multiplied by cost).

Host device 112 may then stage real-time data at one or more of the storage devices associated with predicted locations, in accordance with the probability-cost-benefit analysis (step 614). For example, host device 112 may stage the real-time data at the storage devices that have a weight greater than a threshold. In this way, host device 112 may balance the financial cost of staging real-time data at a particular storage device with the probability of mobile device 114 being proximate to the particular storage device.

While certain features and embodiments of the invention have been described, other embodiments of the invention will be apparent to those skilled in the art from consideration of the specification and practice of the embodiments of the invention disclosed herein. Furthermore, although aspects of embodiments of the present invention have been described in part as software, computer-executable instructions, and/or other data stored in memory and other storage mediums, one skilled in the art will appreciate that these aspects can also be stored on or read from other types of tangible, non-transitory computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the invention.

It is intended that the specification and examples be considered as exemplary only, with a true scope and spirit of the invention being indicated by the following claims.

What is claimed is:

1. A computer-implemented method, comprising the following operations performed via one or more processors:
   identifying an expected route associated with a mobile device;
   identifying one or more storage devices in proximity the expected route;
   selecting one or more of the identified storage devices based on at least one of a geographical distance between the identified storage devices and the expected route, a number of links between the identified storage devices and the expected route, a processing speed of the identified storage devices, or a speed for communications between the identified storage devices and the expected route; and
   enabling real-time data published by or provided to the mobile device, to be stored on the one or more selected storage devices.

2. The method of claim 1, wherein identifying the expected route associated with the mobile device further comprises determining the expected route based on location data associated with the mobile device and a destination location.

3. The method of claim 1, wherein the location data associated with the mobile device further comprises global positioning data transmitted from the mobile device.

4. The method of claim 1, wherein the location data associated with the mobile device further comprises network address data transmitted from the mobile device and location data associated with the network address.

5. The method of claim 1, wherein identifying the expected route associated with the mobile device further comprises determining the expected route based on location data associated a source location and a destination location.

6. The method of claim 1, further comprising:
   providing an instruction to the mobile device to publish sensor-collectable data collected via the mobile device to the one or more selected storage devices; and
   retrieving the sensor-collectable data from the one or more selected storage devices.

7. The method of claim 1, wherein the one or more identified storage devices are further selected based on:
   a probability that the mobile device will travel to a location along the expected route; and
   a cost associated with staging the real-time data at the potential storage device.

8. The method of claim 1, wherein identifying a set of storage devices based on the expected route is further based on a probability that the mobile device will travel to a location along the expected route.

9. The method of claim 1, wherein the one or more identified storage devices are further selected based on:
   determining a weight for each of the identified set of storage devices based on a probability that the mobile device will travel to a location along the expected route and a cost associated with staging the real-time data at each of the identified set of storage devices, and
   wherein the real-time data is stored when the weight exceeds a threshold.

10. The method of claim 1, further comprising polling the mobile device and receiving the location data from the mobile device based on the poll.

11. The method of claim 1, further comprising receiving location data from the mobile device.

12. The method of claim 1, wherein the real-time data includes a current temperature associated with a physical object, the physical object being associated with the mobile device.

13. The method of claim 1, wherein identifying the expected route associated with the mobile device further comprises predicting a plurality of geographic locations to which the mobile device may be associated in a subsequent time period based on a set of known package delivery routes.

14. The method of claim 1, wherein the predicted plurality of geographic locations comprise GPS coordinates.

15. The method of claim 1, wherein the real-time data comprises environmental data including at least one of location data, temperature data, light data, motion data, pressure data, humidity data, gas level data, airflow data, vibration data, radiation data, time data, audio data, video data, or orientation data.

16. The method of claim 1, wherein enabling real-time data provided to the mobile device to be stored on the one or more selected storage devices further comprises transmitting the real-time data to the one or more selected storage devices for the mobile device to access.

17. The method of claim 16, wherein the accessed real-time data further comprises environmental thresholds for a package associated with the mobile device.

18. The method of claim 17, further comprising receiving an alarm notice from the mobile device that one or more of the environmental thresholds for the package have been exceeded.

19. A computer-implemented method, comprising the following operations performed via one or more processors:
   identifying a plurality of expected routes associated with a mobile device;
   identifying one or more storage devices in proximity to each expected route;
   selecting, for each expected route, at least one of the identified storage devices based on at least one of a geographical distance between the at least one identified storage device and one of the expected routes, a number of links between the at least one identified storage device and one of the expected routes, a processing speed of the at least one identified storage device, or a speed for communications between the at least one identified storage device and one of the expected routes; and
   enabling real-time data published by or provided to the mobile device, to be stored on the at least one identified storage device for each expected route.

20. A computer-implemented method, comprising the following operations performed via one or more processors:
   identifying an expected route associated with a mobile device;
   identifying a plurality of storage devices in proximity the expected route;
   selecting a plurality of the identified storage devices based on at least one of a geographical distance between the identified storage devices and the expected route, a number of links between the identified storage devices and the expected route, a processing speed of the identified storage devices, or a speed for communications between the identified storage devices and the expected route; and
   enabling real-time data published by or provided to the mobile device, to be stored on the plurality of selected storage devices.

21. A system for staging data, comprising:
a mobile device; and
a host device having a memory and one or more processors, the memory storing instructions that, when executed by the one or more processors, cause the one or more processors to perform a method comprising:
   identifying an expected route associated with the mobile device;
   identifying one or more storage devices in proximity the expected route;
   selecting one or more of the identified storage devices based on at least one of a geographical distance between the identified storage devices and the expected route, a number of links between the identified storage devices and the expected route, a processing speed of the identified storage devices, or a speed for communications between the identified storage devices and the expected route; and
   enabling real-time data published by or provided to the mobile device, to be stored on the one or more selected storage devices.

22. A non-transitory computer-readable medium storing instructions that, when executed by one or more processors, cause the one or more processors to perform a method, comprising:
   identifying an expected route associated with a mobile device;
   identifying one or more storage devices in proximity the expected route;
   selecting one or more of the identified storage devices based on at least one of a geographical distance between the identified storage devices and the expected route, a number of links between the identified storage devices and the expected route, a processing speed of the identified storage devices, or a speed for communications between the identified storage devices and the expected route; and
   enabling real-time data published by or provided to the mobile device, to be stored on the one or more selected storage devices.

23. A system for staging data, comprising:
means for identifying an expected route associated with the mobile device;
means for identifying one or more storage devices in proximity the expected route;
means for selecting one or more of the identified storage devices based on at least one of a geographical distance between the identified storage devices and the expected route, a number of links between the identified storage devices and the expected route, a processing speed of the identified storage devices, or a speed for communications between the identified storage devices and the expected route; and
means for enabling real-time data published by or provided to the mobile device, to be stored on the one or more selected storage devices.

* * * * *

UNITED STATES PATENT AND TRADEMARK OFFICE
CERTIFICATE OF CORRECTION

PATENT NO. : 10,993,167 B2  
APPLICATION NO. : 16/410702  
DATED : April 27, 2021  
INVENTOR(S) : Ole-Petter Skaaksrud et al.

Page 1 of 1

It is certified that error appears in the above-identified patent and that said Letters Patent is hereby corrected as shown below:

In the Claims

Claim 1, Column 11, Line 11, "proximity the" should read as --proximity to the--.

Claim 20, Column 12, Line 55, "proximity the" should read as --proximity to the--.

Claim 21, Column 13, Line 9, "proximity the" should read as --proximity to the--.

Claim 22, Column 13, Line 28, "proximity the" should read as --proximity to the--.

Claim 22, Column 14, Line 17, "proximity the" should read as --proximity to the--.

Signed and Sealed this  
Twelfth Day of July, 2022

Katherine Kelly Vidal  
*Director of the United States Patent and Trademark Office*